United States Patent [19]
Thomson et al.

[11] Patent Number: 5,680,145
[45] Date of Patent: Oct. 21, 1997

[54] LIGHT-WEIGHT REFLECTOR FOR CONCENTRATING RADIATION

[75] Inventors: Mark W. Thomson, Ventura; Geoffrey W. Marks; John M. Hedgepeth, both of Santa Barbara, all of Calif.

[73] Assignee: Astro Aerospace Corporation, Carpinteria, Calif.

[21] Appl. No.: 614,329

[22] Filed: Mar. 12, 1996

Related U.S. Application Data

[63] Continuation of Ser. No. 214,146, Mar. 16, 1994, abandoned.

[51] Int. Cl.$^6$ .................................................. H01Q 15/20
[52] U.S. Cl. ............................ 343/915; 343/840; 343/882
[58] Field of Search ................................ 343/840, 882, 343/912, 915, 916, 897; H01Q 15/14, 15/20

[56] References Cited

U.S. PATENT DOCUMENTS

| | | | |
|---|---|---|---|
| 3,496,687 | 2/1970 | Greenberg et al. | 343/915 |
| 3,599,218 | 8/1971 | Williamson et al. | 343/915 |
| 3,618,111 | 11/1971 | Vaughan | 343/915 |
| 4,475,323 | 10/1984 | Schwartzberg et al. | 343/915 |
| 4,482,900 | 11/1984 | Bilek et al. | 343/915 |
| 4,635,071 | 1/1987 | Gounder et al. | 343/912 |
| 4,896,165 | 1/1990 | Koizumi | 343/915 |
| 4,989,015 | 1/1991 | Chang | 343/915 |
| 5,104,211 | 4/1992 | Schumacher et al. | 343/912 |
| 5,228,258 | 7/1993 | Onada et al. | 343/915 |
| 5,440,320 | 8/1995 | Lach et al. | 343/915 |

FOREIGN PATENT DOCUMENTS

| | | | |
|---|---|---|---|
| 59-28704 | 2/1984 | Japan | 343/915 |
| 2120857 | 12/1983 | United Kingdom | 343/915 |

*Primary Examiner*—Michael C. Wimer
*Attorney, Agent, or Firm*—Loeb & Loeb LLP

[57] ABSTRACT

A reflector assembly for use in antennas or solar collectors in which light weight and high reflector surface shape accuracy are essential for maintaining desired RF or light reflection requirements. The assembly is provided with a rigid, deployable outer support rim and at least one curved frame net supported by the outer rim. The frame net may be formed of a network of intersecting bands extending across the surface. A reflective material is placed against the frame net. A load is applied to the frame net to form a concave surface. The assembly is collapsible for convenient delivery into space prior to deployment.

43 Claims, 15 Drawing Sheets

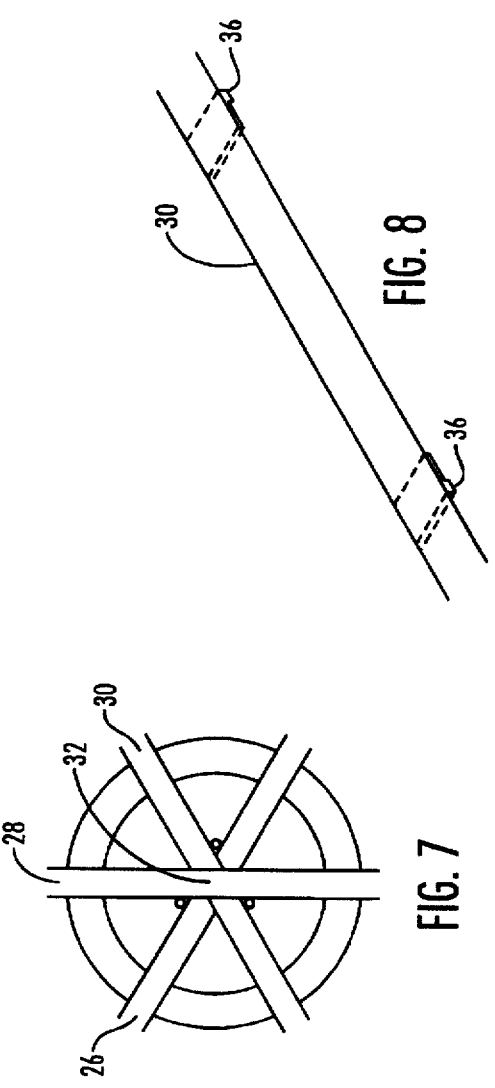
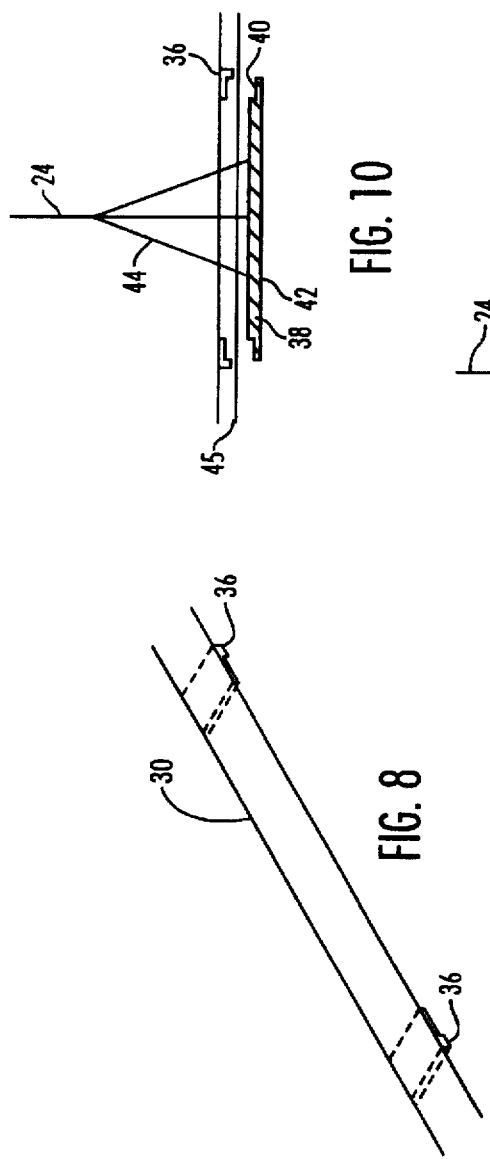
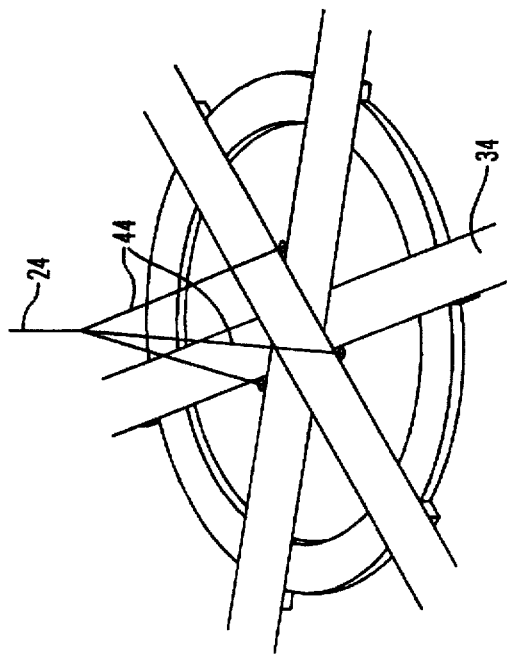
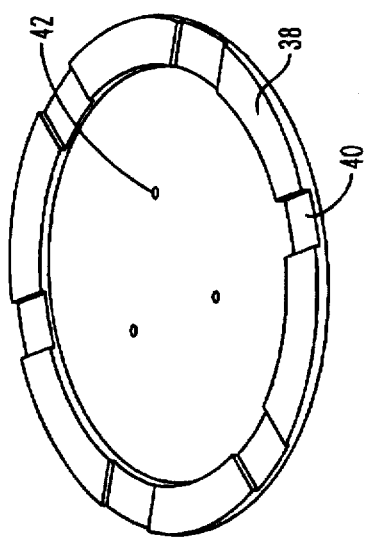

LIGHT-WEIGHT REFLECTOR FOR CONCENTRATING RADIATION

This is a continuation of application Ser. No. 08/214,146 filed on Mar. 16, 1994, now abandoned.

BACKGROUND OF THE INVENTION

1. Field of the Invention

The present invention relates to lightweight reflectors, for use in antennas and solar concentrators, for example. Reflectors according to the invention can be constructed as large aperture reflectors for antennas mounted on spacecraft.

2. Description of Related Art

Reflectors for concentrating RF radiation are employed in a variety of antennas installed in spacecraft or mounted on the ground. Reflectors for concentrating solar radiation are employed as solar energy collectors in systems for converting solar energy into electrical energy.

Satellite and communications technologies often require that space-based devices and other high technology machinery be lightweight yet durable to withstand the effects of the space environment. Such devices, however, must also be practically devised to be launched from earth in a small package and deployed in space autonomously It is believed that future space missions will require large-aperture, lightweight deployable reflector antennas and their overall weight must be minimized to enable more economical transportation to, and deployment in, space. Thus, to deploy and maintain in orbit an antenna having a 25 m aperture, the weight of the reflector antenna must be extremely light with a low areal density. A density of less than 1 kg/m² is preferable.

In addition to the need for lightweight reflector antennas, the antenna must also be precise. The radiated power must be contained in the main lobe of the radiation pattern of the antenna, rather than the side lobes. Accordingly, reflector antennas typically have a paraboloidal shape to precisely intercept incoming radio or optical waves and reflect the waves to a common focal point. Any deviation in the reflector surface must be minimized to maintain the desired radiation pattern. For example, the radiation-pattern error is dependent on the radio frequency (RF) wavelength and the RMS error, i.e. the RMS value of the deviation normal to the reflector surface. The RMS error is preferably limited to 1/50 of the RF wavelength. Therefore, as future space missions require higher frequencies with shorter wavelengths, more rigorous accuracy requirements must be met.

One difficulty of constructing such large antenna structures with high precision is caused by a multitude of disturbing effects such as thermal strain, material changes, fabrication imperfection, and deflections caused by 1 g testing. A paraboloidal reflector antenna that can overcome most of these negative effects economically must be structurally deep.

Some conventional reflector antennas are characterized by thin solid curved shells or rib-supported metallized screens which form the reflector surface. The solid shell reflector is generally used for antennas having apertures which are sufficiently small to be stowed for launch without being folded. For large-aperture antennas, the mesh reflector type is typically used. For example, some large antennas operating in space use conductive mesh to form the reflective surfaces. Examples of such devices include the 9.0 m diameter wrap-rib antenna made by Lockheed Missiles and Space Company for the ATS-6 spacecraft and the 4.9 m diameter radial rib antenna developed by the Harris Corporation for the TDRS and Galileo spacecraft.

The current technology is routinely applied to reflector antennas having an aperture-to-wavelength ratio of about 100. Larger ratio values, from 1,000–10,000 for example, however, have been difficult to achieve for a variety of reasons. For example, the wrap-rib antenna requires very closely-spaced ribs to meet the demanding surface accuracy requirements since the mesh flattens out between the ribs. As a result, such an antenna requires a large number of ribs as well as a large hub to accommodate all of the ribs. This, in turn, causes the reflector antenna to be heavy and stow inefficiently. In addition, the wrap-rib antenna is typically structurally shallow, and thus lacks basic structural stability. One example of a wrap-rib antenna is described in U.S. Pat. No. 5,032,016 issued to Youngkeit on Jul. 16, 1991.

The radial-rib type antenna also has certain drawbacks in that the stowed length is approximately the same as its deployed radius. Thus, the application of such an antenna is limited to small-aperture requirements in which the diameter of the antenna is sufficiently small for transportation and deployment in space without further folding. To overcome difficulties due to size and stowability, foldable ribs have been developed to reduce the maximum stowed package length. For example, the Harris articulating radial rib concept, in addition to the TRW precision adjustable mesh surface concept, uses folding ribs to provide a more compact package. The folding radial-rib type designs, however, are supported by a system of drop cords which, in turn, are supported by tension beams. The process for properly adjusting the length of the drop cords to maintain the accuracy of the antenna, however, is complicated and is often hampered by the effects of gravity as well as the tendency for the structure to change slightly with each deployment. Thus, the shape of the radial-rib antenna is substantially dependent upon the balancing of forces on each of the ribs, as well as on the interaction of each of the structural members. As a result, the application of such radial-rib antennas to space devices requiring a high aperture-to-wavelength ratio becomes very expensive.

In other prior art devices, deep-truss structures have been found to be accurate and thermally stable for supporting antenna surfaces. However, deep-truss frames are often undesirably heavy for space applications. In addition, some large reflector structures use membrane-type domes which span the collector area. The dome is supported at its edges by a stiff rim which is rigid enough to accept operational loads without deformation. The membrane must be constructed of materials which can assure the proper curvature during deployment, yet withstand extreme temperature variations and other disturbing environmental effects.

However, materials which can be compactly stowed before deployment typically require substantial prestressing to achieve reasonable stiffness or require some other means to smooth out wrinkles caused by the packaging. For example, it has been found that twisted, braided, knit or woven configurations should be avoided to insure that high stiffness can be maintained while avoiding wrinkles. For low packaging ratios, e.g., 5-to-1, where the compact, stowed size of the antenna is not exceptionally smaller than the deployed size, the membrane may be able to be folded without causing deep creases. By fixing the boundary of the membrane and avoiding wrinkles, the desired surface shape can be restored upon deployment with gentle lateral pressure. Or, the membrane may be rolled into a small diameter before stowing. However, although the stowed roll has a small diameter, its length is nevertheless equal to the deployed diameter so that the overall packaging ratio is small. Thus, for greater packaging ratios such as 10-to-1 or higher, as are often required, undesirable creases and wrinkles are typical, thereby necessitating more efficient packaging methods.

In the case of ground based solar energy concentrators, the cost of the mechanisms needed to pivot them depends on the weight of the reflector and its support structure, so that a reduction in this weight would reduce the cost of the overall system.

SUMMARY OF THE INVENTION

Accordingly, it is an object of the present invention to provide an improved lightweight reflector having high accuracy for mounting on a spacecraft or on the ground, obviating for practical purposes the above-mentioned limitations.

These and other objects and advantages are accomplished, according to the invention, by the provision of a lightweight reflector assembly having a deployed state and comprising, when in the deployed state: a rim structure having a longitudinal axis and a closed periphery centered on the longitudinal axis, the rim structure having first members which form first and second radially stiff peripheral edges and a plurality of second members which extend between the peripheral edges to cause the peripheral edges to be spaced apart in the direction of the longitudinal axis while opposing forces tending to move the peripheral edges toward one another; a reflector structure having a substantially curved reflecting surface and comprising a flexible stratum, mesh, layer, or membrane of nearly inextensible material; and tensioning means connected to the stratum for applying tensioning forces which cause the stratum to conform to the curved reflecting surface.

Optimum focussing of incident collimated radiation to a point or small diameter circular spot is achieved when the curved surface has a paraboloidal shape. However, the shape of the curved surface may deviate from a paraboloid due to inaccuracies in the manufacturing process, design decisions based on economic consideration, or for other reasons. The shape of the curved surface may also deviate from a paraboloid if the radiation is to be concentrated on an area having an outline other than that of a small diameter circular spot, for example if RF or solar radiation is to be concentrated on a rectangular area. Therefore, when reference is made herebelow to "paraboloidal", it will be understood that this term encompasses shapes which deviate from a true paraboloid but are nevertheless intended to reflect and concentrate incident radiation.

As discussed in more detail below, antenna embodiments of the present invention are suitable for compact stowage, yet allow quick, unrestricted deployment in space with minimal distortion. The basic support structure concept according to the embodiments illustrated in the figures includes a paraboloidal reflector surface which is maintained in its paraboloidal shape by the high stiffness provided by a variety of structural members.

The reflector structure may be an electromagnetically reflective mesh supported by a frame network or net, of three sets of flexible, substantially inextensible tension members such as bands or wires. As used herein, "flexible" is intended to mean pliant, or incapable of retaining any given shape when not subjected to tensile forces. A flexible band or tape in an antenna according to the invention can be crumpled, bent, folded, coiled, etc., and yet will be made to follow a defined curved path, free of creases or wrinkles, when placed under tension. At the same time, a flexible band or tape according to the invention is substantially inextensible in its length dimension, i.e. even when subject to tensile forces applied to its ends, it will not stretch to any significant extent.

The bands extend across the reflector surface and are joined at nodes where they intersect, forming a network of interconnected triangles. The configuration of the triangles across the network approximates a series of nested rings. Depending upon the desired aperture size, and shape precision, the number of nested rings will vary. The bands are positioned so that each band follows a line which approaches a line of least length over the paraboloidal surface while respecting the condition that three bands, one from each set, intersect at each node, forming a substantially geodesic structure.

A reflecting mesh material is extensible so as to be stretched across the back side of the supporting triangulated network of bands to conform to the paraboloidal shape of the network.

Tension ties are attached to the intersecting nodes of the bands, through the reflective mesh material at the back side of the reflector surface. The tension ties are preferably mounted to a supporting base to apply a load to the net to form a paraboloidal structure. As the mesh stretches over the rear convex side of the paraboloidal net structure, discernible triangular facets are formed in the surface of the mesh extending across the triangles formed by the intersecting bands.

The tension ties are attached to a rear supporting structure. In a preferred embodiment, a second paraboloidal support network, or net, of intersecting bands is arranged back-to-back with the reflector frame network which carries the reflective mesh. That is, the support network is of an inverted version of the reflector frame network so that the convex central areas of the networks are close to each other. Preferably, the inverted support network is identical to the reflector frame network such that the total numbers of rings and intersecting nodes are equal for the two opposing network structures. In this way, the tension ties may be coupled between oppositely-oriented nodes of the two networks with minimal adjustment of the applied tension and shifting of the networks relative to each other. Because the surface accuracy of the networks is provided by the inextensible bands, the tension ties and their relative reactions do not need to be precisely adjusted. As long as sufficient stiffness is imparted to the reflector network, the tensioning loads may vary by reasonable amounts with minimal shape degradation.

The frame net is surrounded by and coupled to a preferably collapsible stiff outer rim having high dimensional stability. The rim may be stowed into a small package and, when desired, may be quickly deployed into a substantially stable structure. In a preferred embodiment, the outer rim has a sufficient length, parallel to the axis of the paraboloidal reflector, to support both the frame net and the inverted support net. The outer rim is composed of upper and lower stiff rings coupled together at the ends of a plurality of struts which extend approximately perpendicularly to the rings about the perimeter of the outer rim. The outer rim is attached to the outer peripheries of the nets to support and brace the net structures to withstand large loads.

Thus, the outer rim is constructed to be a deployable stiff truss which is strong enough to support the nets, yet lightweight. The structural elements of the rim counterbalance and support each other to withstand most external disturbances in space, such as vertical and radial distortions. The structurally stiff rim is stiff against vertical distortion and thus supports the nets, while the nets are stiff against radial distortion and apply longitudinal tension forces to the outer rim.

Folding and deployment of the reflector antenna components may be accomplished in a variety of ways to minimize the overall package size to accommodate the various space limitations of different spacecraft. Preferably, the antenna is stowed in a folded, collapsed configuration and coupled to an extension member. The rim truss can be folded by incorporating articulating truss struts and longerons, as well as rotatable hinges and linkages. The reflector mesh and nets can be folded in a manner depending upon the particular materials used and the aperture size of the reflector surface. Thus, upon deployment of the outer rim, the nets can simultaneously be deployed. With proper attachments to the nets, the outer rim may be deployed in a strain-free manner, then the net may be tensioned.

Antennas according to the invention can also be made in a nondeployable form, using a rigid frame structure.

The paraboloidal reflector structure of antennas of this type may be constituted by a plurality of elements, or facets, composed of metal sheets joined at their corners to tension ties.

BRIEF DESCRIPTION OF THE DRAWINGS

The detailed description will be made with reference to the accompanying drawings, wherein like numerals designate corresponding parts in the several figures.

FIG. 7 is a rear view of a positioning plate used in antennas according to an embodiment of the present invention.

FIG. 8 is a perspective view of precision stop members disposed on a continuous tape band for use with the positioning plate of FIG. 7.

FIG. 9 is a perspective view of the positioning plate of FIG. 7.

FIG. 10 is a cross-sectional view of the structure shown in FIG. 7.

FIG. 11 is a perspective view of the structure shown in FIG. 7.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating the general principles of embodiments of the invention. The scope of the invention is best defined by the appended claims.

Figure 1:
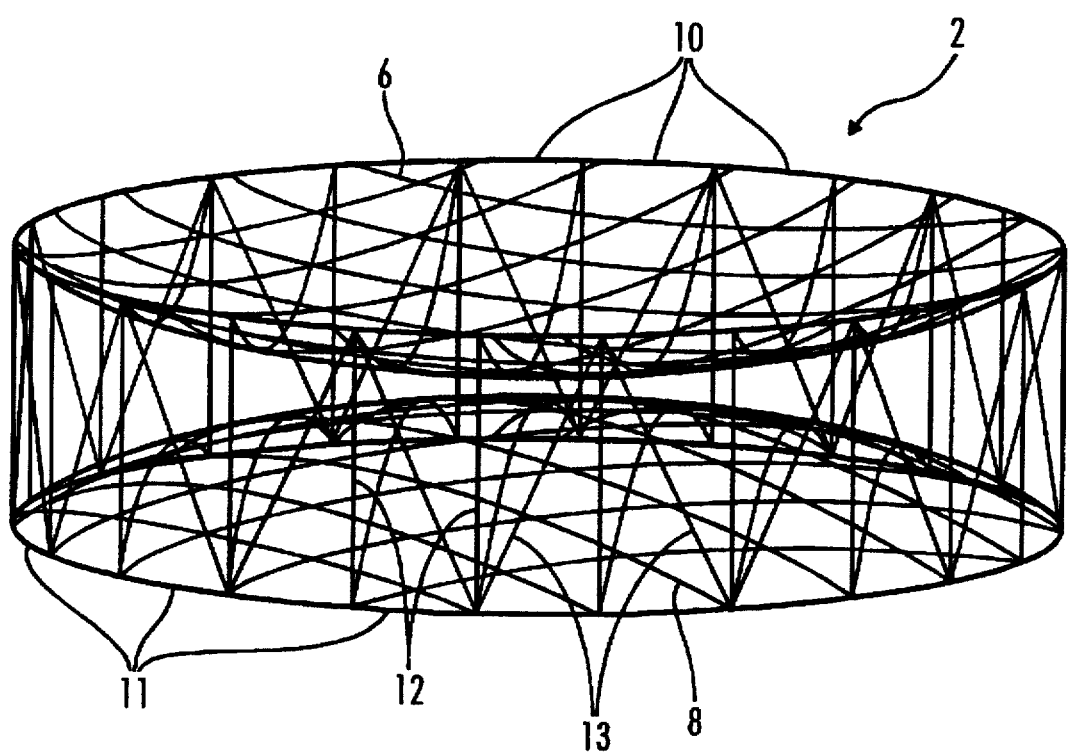
FIG. 1 is a perspective view of an embodiment of a reflector antenna of the present invention.

FIG. 1 is a perspective view of a reflector antenna 10 according to an embodiment of the present invention. Antenna embodiments of the present invention are suitable for deployment in space and on spacecraft. Particularly, embodiments of the invention are large-aperture, lightweight reflector antennas which can be compactly stowed during transportation and delivery, and thus prepared for eventual deployment in space.

While various embodiments of the present invention may also be suitable for other uses in which weight and deployability are factors, reflector antennas of the present invention are characterized by low density and weight, and maximum durability and dimensional precision. To maintain high precision of large-aperture structures in the face of a variety of disturbing effects such as thermal strain, material changes, and fabrication imperfections, it has been found that a deep structural configuration which loads members only in tension or compression significantly reduces the degrading environmental effects. Accordingly, dimensional and structural stability of the reflector antenna is a significant design requirement for most spacecraft-mounted reflector antennas.

Referring to FIG. 1, reflector antenna 2 is provided with an outer rim structure which surrounds and supports front and rear units, such as networks, or nets, 6 and 8 formed of a plurality of flexible, non-extensible bands or tapes. One of the nets 6 or 8 is a front net and the other is a rear net. The only essential difference is that the front net supports a conductive mesh which acts to reflect radio waves. It should be noted that the terms such as "front," and "rear," describing the orientations of the net structures are generally interchangeable. In addition, the front unit, or net, can also be termed a frame unit, or net, whose purpose is to provide the reflecting surface, and the rear unit, or net, can also be termed a support unit, or net, whose purpose is to support tension members which apply the pretension in the net supporting the conductive mesh so that it will have the desired shape.

The conductive mesh is not shown in FIG. 1 because it would obscure illustrated structural components. Typically, the conductive mesh is a knitted fabric which is stretched across the convex side of the front net. Nevertheless, it will be recognized that the mesh may be carried by the rear net, or by both nets, if desired, depending upon weight limitations. Furthermore, because the orientation of the antenna and spacecraft as it orbits in space may vary markedly, the designations of front and rear nets are purely relative to the electromagnetically reflective surface of the antenna.

As will be discussed in detail below, the outer rim is sufficiently rigid, yet lightweight, to withstand disturbing environmental effects. The front, or frame, net acts as a structure to support and carry the reflective mesh or other material which comprises the reflective antenna surface. Although it will be recognized that only the front net carries the reflective mesh, the preferred embodiments includes the second, rear net which maintains the paraboloidal structure of the frame net, as will be discussed below. The rear net preferably has the same or similar dimensions as the front net. As shown in FIG. 1, the two nets are arranged in an inverted, back-to-back configuration.

When rear net 8 is substantially identical to front net 6, a number of advantages result. In particular, no added design costs are associated with the rear net and fabrication of two identical nets is more economical than fabrication of structurally different nets. Furthermore, when nets 6 and 8 are identical, the front and rear edges of the rim structure will have identical radial loading and this will contribute significantly to maintenance of the desired shape of the rim structure.

The rim shown in FIG. 1 is composed of a front net ring composed of a plurality of longerons 10 and a rear net ring composed of a plurality of longerons 11. A plurality of vertical struts 12 are connected between the upper and lower net rings along with diagonal struts 13. Longerons 10 and 11 and vertical struts 12 are preferably rigid members which are hinged at their points of connection to permit antenna 2 to be stowed. Diagonal struts may be telescoping members which extend to a maximum length when antenna 2 is in the fully deployed state shown in FIG. 1, or may be flexible, inextensible members.

Figure 2:
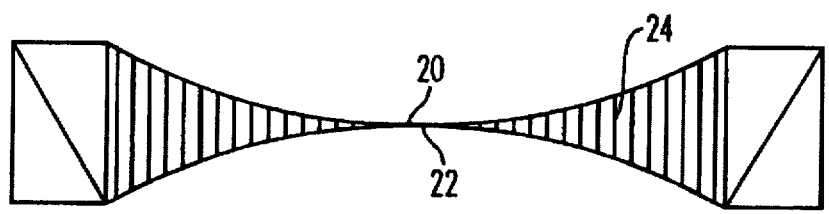
FIG. 2 is a pictorial cross-sectional view showing a slice through the center of another embodiment of a reflector antenna according to the invention.
Figure 3:
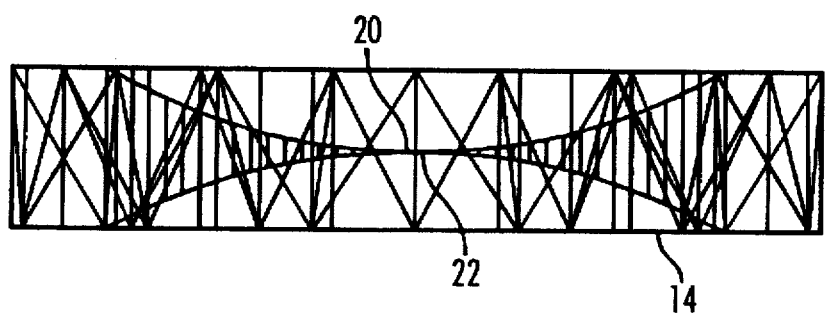
FIG. 3 is a side view of the antenna of FIG. 2.

As illustrated in FIGS. 2 and 3, and discussed in more detail below, tension ties 24 are fastened between nets 6 and 8 to apply sufficient tension to the surface of the frame net to produce a paraboloidal shape in at least net 6. A load is thus applied between the surfaces of the frame and support nets so that the convex centers 20 and 22, respectively, of the inverted nets are close together relative to the outer peripheral area of each net.

It will be recognized that a variety of different methods are available to produce the paraboloidal shape of the reflector net. For example, gas pressure may be applied to cause the face of the reflector net to form a concave surface. Or electrostatic or hydrostatic tension may be applied to the rear side of the reflector surface to pull the center of the surface into a paraboloidal structure. Such methods, however, require continuous reflective surfaces which tend to produce high drag and thus may not be desirable for certain space applications. Another method for forming the paraboloidal net is to use centrifugal loading in which rotation of the net causes the net to become bowed at its center. Centrifugal loading, however, is generally limited to low load capability and very specialized spacecraft configurations. The use of mechanical tension ties according to the invention avoids these drawbacks and offers improved operating reliability, structural simplicity and reduced construction cost.

The embodiment shown in FIGS. 2 and 3 differs from that of FIG. 1 in two respects. One of these differences is the spacing between nets 6 and 8 at their centers. FIGS. 2 and 3 show the theoretical lower limit for this spacing; if mechanical tension ties 24 are used according to the invention, such minimum spacing will not be achievable.

Figure 17:
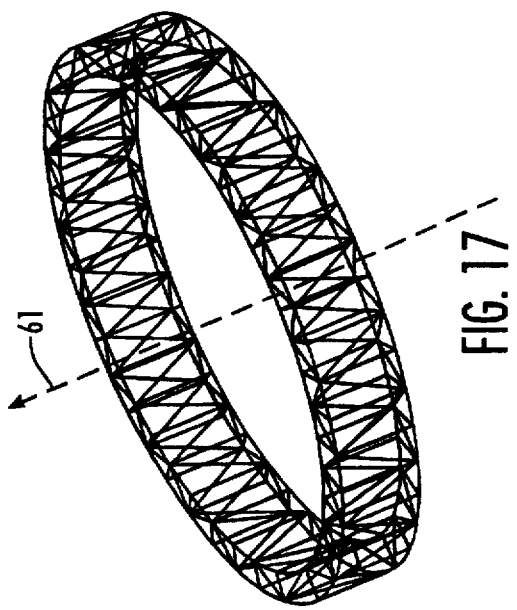
FIG. 17 is a perspective view of another embodiment of an outer rim structure according to another embodiment of the present invention.
Figure 18:
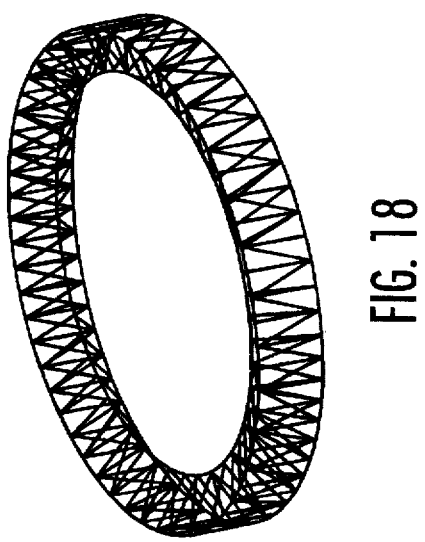
FIG. 18 is a perspective view of another embodiment of an outer rim structure according to another embodiment of the present invention.
Figure 16:
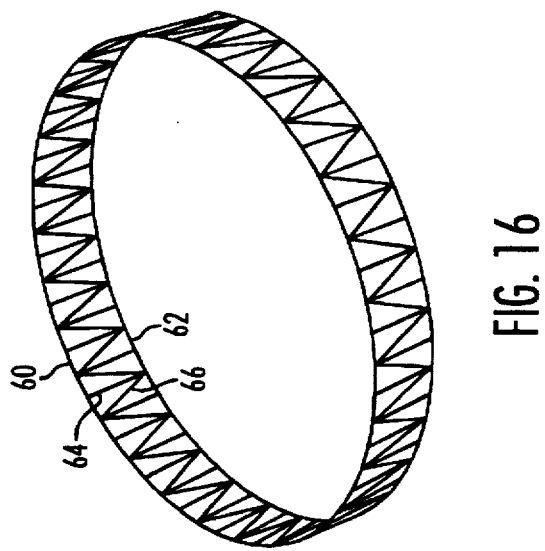
FIG. 16 is a perspective view of an embodiment of an outer rim structure according to the present invention.

The other difference relates to the configuration of the outer rim structure. In FIG. 1, the outer rim structure has two peripheral edge rings 10, 11 each comprised of longerons arranged end-to-end in a ring each supporting a respective network 6, 8; this structure is also shown in FIG. 16. In FIGS. 2 and 3, the rim structure 14 has four peripheral edges and a rectangular cross section, also shown in FIG. 17. Another possibility is a rim structure with three peripheral edges, as shown in FIG. 18.

The choice of rim structure configuration depends on mechanical requirements. A rim structure with two peripheral edges is the simplest and lightest structure and requires the simplest collapsing mechanism. A rim structure with three peripheral edges can support greater loads. A rim structure with four peripheral edges has maximum stiffness and can tolerate fracture of members.

Reverting to FIGS. 2 and 3, the outer rim structure coupled to the paraboloid-shaped net or nets has sufficient compressive strength to counterbalance, or resist, the forces applied to the nets by the tension ties 24, as well as torsional forces which could cause the reflective surface of the antenna to be undesirably distorted. Accordingly, the rim provides sufficient stability and strength to the nets 6 and 8 to enable the nets to withstand a variety of external disturbances. As will be discussed in detail below, the outer rim is collapsible for stowage during transportation to the particular site in space where the antenna will be deployed. Likewise, the upper and lower nets 6 and 8 may be folded or rolled into a compact cylindrical package.

Figure 4:
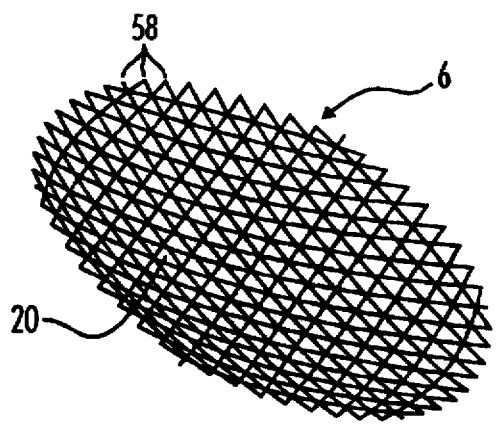
FIG. 4 and 5 are perspective views of two networks forming part of an antenna according to the invention.
Figure 5:
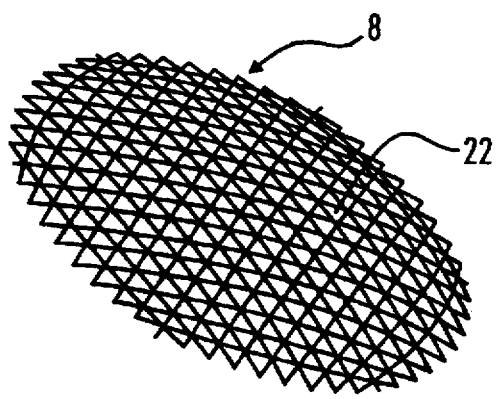
Figure 6:
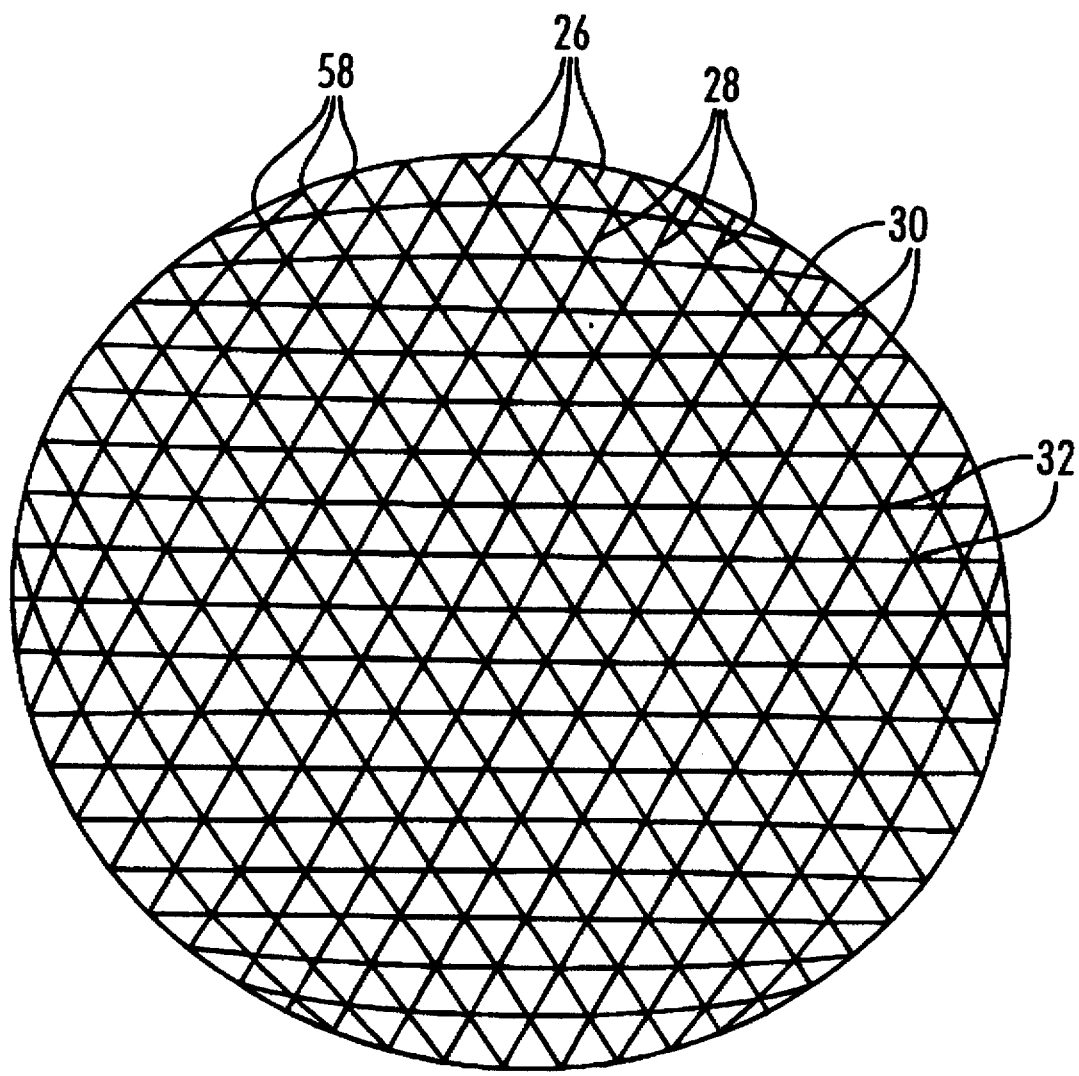
FIG. 6 is a plan view of the net structures of FIGS. 4 and 5.

Each circular net 6, 8, as illustrated generally in FIGS. 4 and 5, and more specifically in FIG. 6, is preferably formed of three sets 26, 28, and 30 of substantially inextensible bands extending across the net surface in three directions. The bands cross over each other at points of intersection, or intersecting nodes 32, forming a series of triangles nested in an approximately hexagonal arrangement. Each net 6, 8 may be connected to the rim at peripheral points 58.

The number of triangles depends upon the aperture size of the reflective surface of the frame net. Generally, the size of the net is determined by the maximum number of triangles within the radius of the circular net. For example, FIG. 6 shows a nine-ring net for an off-axis reflector, where the periphery of the frame net, and the outer rim, must be elliptical to provide a circular aperture. Depending upon the particular application, the aperture size of the net may vary. Accordingly, the total number of triangular sections and, therefore, inextensible bands also varies.

It will be recognized that other types of band structures may be implemented to produce the preferred triangular ring formation. Because the construction of the net is driven by the need to develop an extremely lightweight yet strong reflector support frame, while simultaneously being collapsible, other types of band configurations may be used to accommodate a variety of weight and size limitations. For example, continuous bands or discontinuous band segments may be used to form the net surface. Depending upon the desired packing configuration and the desired method for attaching the tension ties to the net, continuous or discontinuous bands may provide for greater efficiency in the packing and/or deployment of the antenna. Furthermore, a hybrid design may consist of a combination of the above-described components.

Referring to FIG. 7, continuous bands 26, 28 and 30 allow for precise and relatively easy positioning of the nodal intersections 32 of a net by simply shifting and adjusting the relative positions of the bands. As described above, preferably three sets of long, continuous bands are placed flat across the net surface area. The bands extend across the net in three crisscrossing directions to form a plurality of triangles arranged in a circular configuration, wherein each circle of triangles is nested within another. The sets of continuous bands may be laid over one another or the bands may be interweaved together.

In a preferred embodiment of FIG. 8 in which a continuous tape band 30 is shown, precision stop elements 36 are disposed at intervals along the length of each of the continuous tape bands to determine the locations of the intersecting nodes 32 of the three sets of bands. As illustrated in FIGS. 9 and 10, a positioning plate 38 is placed at each intersection 32. The positioning plate 38 is a circular disk having machined grooves 40 provided about the perimeter of each plate. The grooves 40 are positioned to meet the precision stops 36 located on each band. In this way, the intersections of three bands can be marked and secured for attachment of tension ties. Three anchor points 42 can be formed in each positioning plate 38, between the intersections of the band members, as shown in FIGS. 7, 9 and 11. Tension ties 24 may then be coupled to the anchor points by guide wires 44 which merge into a single tension tie 24 through a harness or other means for combining the wires together. As will be discussed in greater detail below, the tension ties impart a paraboloidal shape to the frame net. As shown in FIG. 10, a reflective mesh 45 can be placed against net 6 and sandwiched between plates 38 and bands 26–30.

Figure 14:
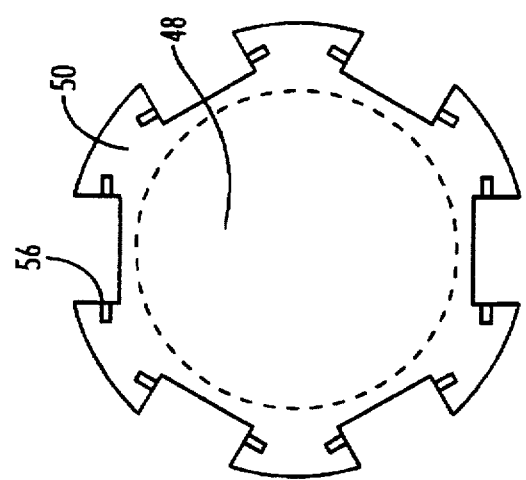
Figure 12:
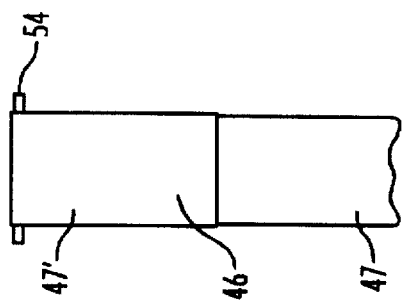
FIG. 12 is a detail plan view of an end of a discontinuous tape segment according to an embodiment of the present invention.
Figure 13:
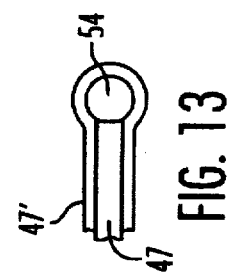
FIG. 13 is a detail side view to an enlarged scale of part of the tape segment end of FIG. 12.

Discontinuous bands, on the other hand, may be useful for certain antenna designs, for example where the collapsed package size is significant. Each discontinuous tape band includes several band portions and each band portion spans only the distance between two adjacent nodes. This approach is preferable to facilitate net stowage schemes that require the bands to be bent beyond their yield points. For example, if continuous tape bands are folded beyond the spring yield points of the materials of which they are made, the bands may be permanently creased or bent beyond a certain angle. In contrast, as shown in FIGS. 12–14, discontinuous band portions 46 are interconnected at hinged node plates 48 so that each band 46, as well as the entire net, may be bent or separated into significantly smaller component parts, if desired. A net formed of discontinuous bands may also provide for easier manipulation and control of the ultimate paraboloidal configuration.

Figure 15:
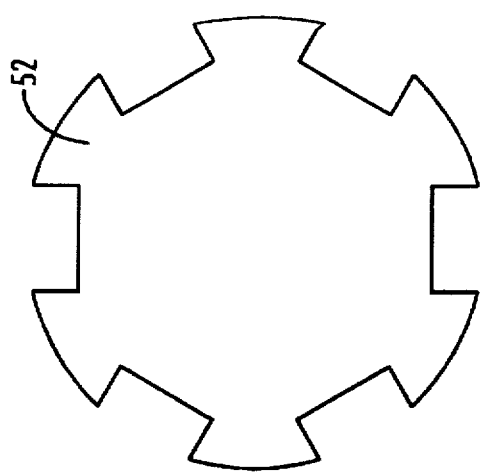
FIGS. 14 and 15 are plan views of another embodiment of a positioning plate, employed with discontinuous tape segments as shown in FIG. 12.

For the embodiment shown in FIGS. 12–15, each band portion 46 includes a length of flexible, substantially inextensible material 47 and, at each end of material 47, a fastening strip or band 47, which holds a retaining pin 54 in place. A pin 54 may be held at each end of each portion 46 by means of mechanical attachment or bonding. As shown in FIGS. 14 and 15, structure 48 is composed of upper and lower plates 50 and 52 which sandwich six hinged portions 46 into position. The top plate 50 is provided with a plurality of machined slots 56 disposed about the periphery of the plate. The machined slots 56 form pin seats which allow pivotal movement of portions 46 about each of pins 54. The bottom plate 52 is placed over top plate 50 to enclose the open pin seats 56, preventing pins 54 from slipping out of pin seats 56. Thus, the pin-end of each tape segment 46 is seated in one of the pin seats 56 in the top plate 50, and held in place by the bottom plate 52. Tension ties may be attached centrally on the face of either the top or bottom plate, depending upon the orientation of the plates, to apply sufficient force to form the desired paraboloidal structure.

As described briefly above, the paraboloidal structure of the frame net and possibly the support net is formed by the application of loads with components approximately normal to the reflector surface. Thus, the dominant loading in the preferred embodiment of the deployed structure is applied by tension ties 24, disposed as shown in FIGS. 2 and 3. The tension applied to the bands must be maintained at a level sufficient to ensure that a particular band does not curve too much as a result of the tension in the mesh, which applies lateral loads to the bands. Accordingly, the load applied to the tension ties, as well as to each band, must meet a variety of stress levels to ensure that each of the structural members is sufficiently strong.

The tension ties 24, however, require mutual attachment to an opposing support base to counteract the applied forces. Thus, a preferred embodiment of the present invention includes a second support net 8 which is exactly or closely similar to the structure of the primary frame net 6. This configuration is preferable to minimize inconsistencies in construction and positioning of the tension ties to balance forces exerted on the truss, and to minimize cost. An inverted paraboloidal support net having preferably the same size and configuration as frame net 6 is simply positioned a short distance behind frame net 6 (before tension is applied); the two nets are then aligned such that their intersecting nodes are directly across from each other. When tension ties 24 are attached between the respective nodes of the frame net 16 and the inverted support net 18, each of the two nets is forced into a paraboloidal curvature. As a result, the back-to-back convex centers 20 and 22 of the opposing nets are closer together than the outer peripheral areas of both nets.

As shown in FIGS. 1–3, the back-to-back paraboloidal nets 6 and 8 are separated by a deep outer rim 12, 13 coupled to the perimeters of both the frame net 6 and the support net 8. The outer rim is attached to the frame and support nets at outer perimeter nodes 58 formed by two intersecting bands or the end of a single band, illustrated in FIGS. 4 and 6. In preferred embodiments and as shown more clearly in FIG. 16, the outer rim includes a series of upper longerons 60 and lower longerons 62 which, when connected end-to-end, form essentially upper and lower rings separated by a plurality of vertical and diagonal struts 64 and 66, respectively, arranged approximately evenly between and around the perimeter of the two rings. Such a rim structure is designated a two-longeron rim. The upper and lower ring structures are coupled to the frame net and the support net, respectively, to brace the nets in their paraboloidal configurations.

A significant consideration in the design and construction of the outer rim is the need to minimize the weight of the outer rim so that a large percentage of the total weight allowance can be consumed by the nets and the reflective mesh. Unlike a conventional Pacring truss (FIG. 17) which is typically large and includes many heavy strut members, the preferred rim structure of the present invention is the two-longeron rim (FIG. 16) which has significantly fewer struts, and is thus substantially lighter in weight. Consequently, the two-longeron rim is sufficiently lightweight to fall easily within the typical predetermined, limited weight budget allotted for the reflector antenna. Also, it has been found that a balanced combination of the frame and support nets 6 and 8, and the two-longeron rim produces an extremely stiff paraboloidal antenna surface that can withstand a variety of external disturbances. As the outer rim counteracts vertical distortion and thereby supports the nets, the nets likewise counteract radial distortion and support the rim. Accordingly, any external forces which impinge upon the rim and net assembly cancel each other.

While the illustrated embodiment employs a two-longeron outer rim, it will be recognized that further embodiments may employ other stiff deployable truss configurations to carry and support the nets. Such alternative embodiments may be suitable as long as they are sufficiently stiff to brace the reflector surface against external disturbances, and total weight of the reflector antenna falls within the weight budget. An alternative rim truss which may be used is the above-described Pacring structure or a triangular rim structure, depending upon the weight limitations of the overall antenna assembly. For example, the triangular rim embodiment of FIG. 18 includes three-longeron bays and is substantially rigid and strong, without contributing excess weight or size. In comparison to the Pacring truss, the triangular structure also has a reduced number of struts and therefore reduced weight.

Nets 6 and 8 will be coupled to the two outer longerons, or sets of longerons, 10, 60; 12, 62. Thus, the outer rim must provide sufficient stability and stiffness to resist and counter the forces applied by the tension ties 24 to the bands of the nets. For example, in a preferred embodiment, the compressive load in the rim is equal to the total tension in one set of bands, i.e., those bands extending in the same direction across the net surface. Thus, the rim is preferably given a length, along its longitudinal axis 61, as illustrated in FIG. 17, selected to maintain sufficient separation between the two paraboloidal nets in a back-to-back orientation.

The materials used for the nets and supporting rim are preferably strong, stiff, substantially inextensible, lightweight, and precise. In the preferred embodiment, the rim truss parts are formed of a predominantly uniaxial fiber composite tubing.

Preferably, the bands comprising nets 6 and 8 are also made of a predominantly uniaxial fiber composite formed into strips having a rectangular cross section. The material properties would preferably be similar to that of the rim truss material except this material must have a high bonding strain limit. Flexibility is determined essentially by band thickness. In addition, the materials selected for the various structural members of the reflector antenna preferably have other characteristic properties such as a low coefficient of thermal expansion with a high extensional modulus to withstand many possible environmental changes.

The nets and the surrounding support rim arrangement are particularly suited for use in a reflector antenna assembly. Accordingly, the design and construction of the reflective surface is significant. The reflective characteristics of the reflector antenna must display a precise radiation response pattern, and thus must be particularly constructed to minimize structural errors and inconsistencies upon deployment in space. As discussed above, the particular paraboloidal curvature is necessary to precisely intercept incoming radio or optical waves, and to reflect the waves to a common focal point. By definition, a paraboloidal structure reflects signals or waves such that they travel to the focus of the parabolic curvature. Any deviation in the reflector surface must therefore be minimized to maintain the desired paraboloidal radiation pattern.

Accordingly, in the preferred embodiments of FIGS. 1–3, the particular paraboloidal shape and configuration of the reflective mesh (not shown) are maintained by the frame and support net structures 6 and 8. The reflective surface is preferably comprised of a sheet of a reflective mesh material layered behind the frame net. Before the tension ties are attached to the back of the frame net and force is applied, the net is layered over the mesh in a flat configuration.

The knitted reflector mesh is preferably draped sufficiently tautly over the paraboloidal frame net to eliminate wrinkles and creases. Accordingly, the mesh is extensible and tightly stretched across the convex side of the paraboloidal net and forms taut triangular facets indicating the outline of the intersecting frame net bands. Since the frame net is located very close to the reflective mesh, incoming and outgoing electromagnetic signals are reflected off the reflective mesh layer without interference by the net. As a result, the reflectivity of the reflector antenna can be maximized.

Preferably, the knitted reflector mesh is lightweight, yet strong to form a smooth, flat surface when tension is applied to the frame net. The preferred reflective mesh is a warp-knitted gold-plated molybdenum wire.

In preferred embodiments, the outer truss rim and the frame and support net assembly are collapsible for later deployment in space. Because the reflector antenna must be transported to or launched in space and mounted to a variety of spacecraft, the overall package size of the collapsed antenna before deployment is significant. Depending upon the particular configuration of the nets and outer rim, the outer rim is preferably packaged with the paraboloidal nets attached to the rim as a single deployable unit. Preferably, the frame and support nets and mesh are made of sufficiently flexible materials to be spirally rolled within the small cylinder formed inside the collapsed rim. However, as described above, the nets and mesh may also be folded or otherwise compacted, depending upon the particular materials used.

Various packaging concepts are available for collapsing or compressing the outer rim. In one embodiment of the two-longeron rim, shown in FIG. 16, the vertical struts 64 are stowed alternately upward and downward to form parallelograms defined by the longerons. The diagonal struts 66 are preferably articulated so that the upper ends of the downward stowing vertical struts can be folded downward toward the lower ends of the upward moving vertical struts. As a result, the compacted package height is equal to the sum of the ring height and the bay length, which refers to the distance between two vertical struts. Thus, the distance between each of the vertical struts defines a bay. The total number of bays is determined by the size of the nets and the number of bands extending across the net surfaces, which in turn are a function of the desired aperture size of the reflector surface. Alternatively, in another embodiment, the diagonal struts are folded against each other, while the upper longerons are tucked downward into the package and the lower longerons are folded upward. Preferably, the vertical struts can be folded to allow the ends of the upper longerons to move toward the bottom of the package, while the ends of the lower longerons move toward the top of the package. Consequently, the overall package height is the length of one diagonal strut. The package thus forms a cylindrical shape in which the nets may be stowed inside. The deployment sequence of the two-longeron truss begins from a compactly stowed configuration. With proper hinging, the truss deploys in a strain-free manner.

Figure 19:
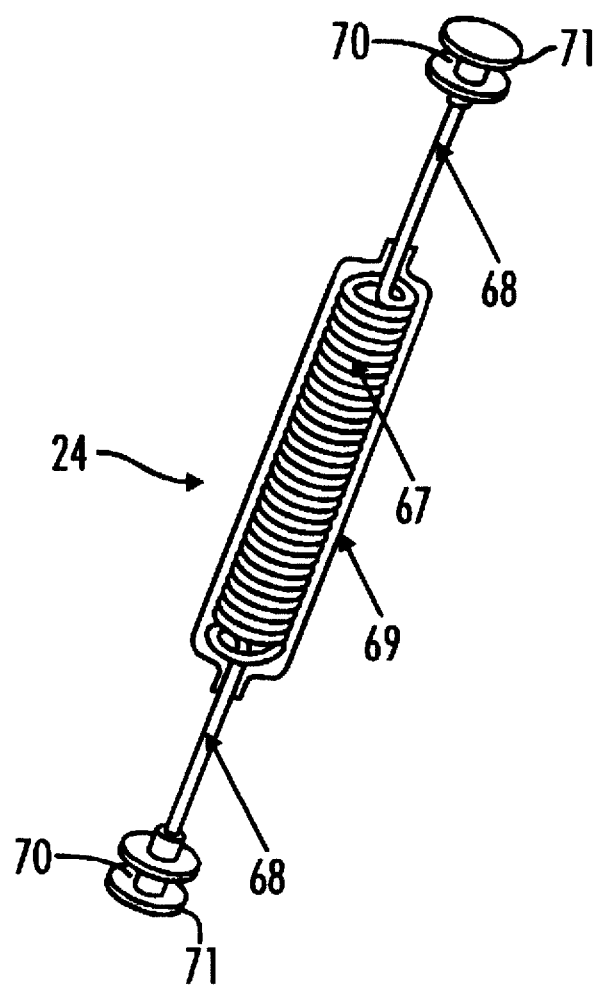
FIG. 19 is a perspective view of one embodiment of a tension tie used in antennas according to the invention.

Preferably, each tension tie 24 joining a node of frame net 6 with a corresponding node on the support net 8 is constructed of a wire or other thin member and spring assembly. One advantageous embodiment of a tension tie 24 is shown in FIG. 19. This includes a single length of wire formed to define a coiled tension spring 67 and two straight wire segments 68. Spring 67 is enclosed in a protective envelope 69. Each free end of tie 24 is provided with a spindle 70 via which tie 24 is secured to nets 6 and 8. Each spindle 70 is a two-piece member having a part 71 which can be securely clipped or screwed to the remainder of spindle 70. Spindles 70 can replace the positioning plates shown in FIGS. 7-11 and 14 and 15. For this purpose, each flexible band of each net and the reflective mesh can be provided with a hole at each point of intersection of the associated net and, with parts 71 removed, a pin on each spindle 70 or part 71 is inserted through corresponding holes in the bands and mesh and parts 71 are clipped or screwed onto the remainder of spindles 70.

Figure 20:
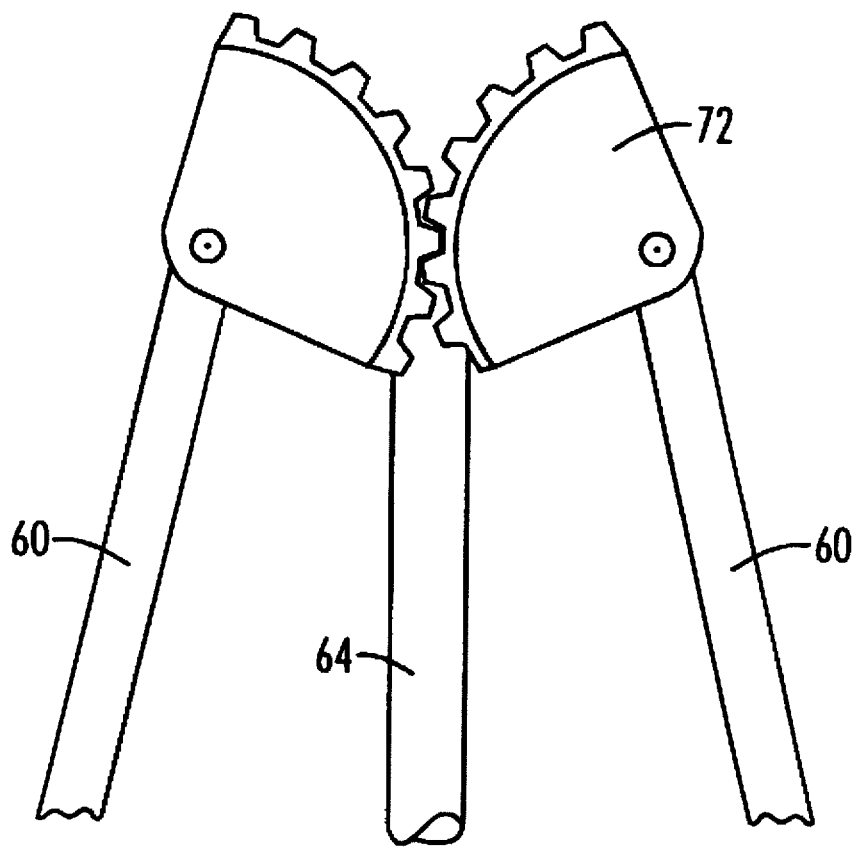
FIG. 20 is a detail view of synchronized gear segments of a rim according to an embodiment of the present invention.

As illustrated in FIG. 20, the outer rim longerons, such as 60, are preferably coupled together via communicating rotatable gear sections 72 which enable synchronized deployment. As the outer rim is deployed, and thus caused to expand, the interlocking gears rotate to allow the rim struts and longerons to lock into a fully deployed configuration at the same time. Synchronized movements minimize stresses in the truss.

In the above-described preferred arrangement using intercommunicating gear sections, a single actuator or a number of distributed actuators may be employed in conjunction with pulleys or other cable and rope-conveying devices provided at selected joints about the outer rim truss. Preferably a single cable is carried by the upper and lower pulleys provided at adjacent joints. The cable forms alternating diagonal struts in the outer rim in a zigzag pattern. Depending upon the type of cable used, the rim may be collapsed or compacted. Then, upon deployment, the cable may be reeled in to allow the rim to expand outward into its predefined, open and deployed configuration.

Figure 21:
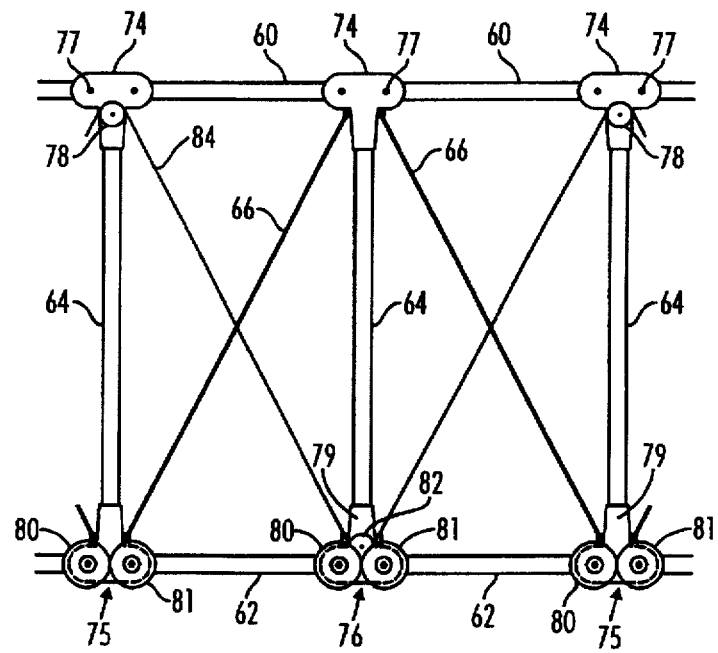
FIG. 21 is an elevational detail view of a portion of a rim structure in a fully deployed state.
Figure 22:
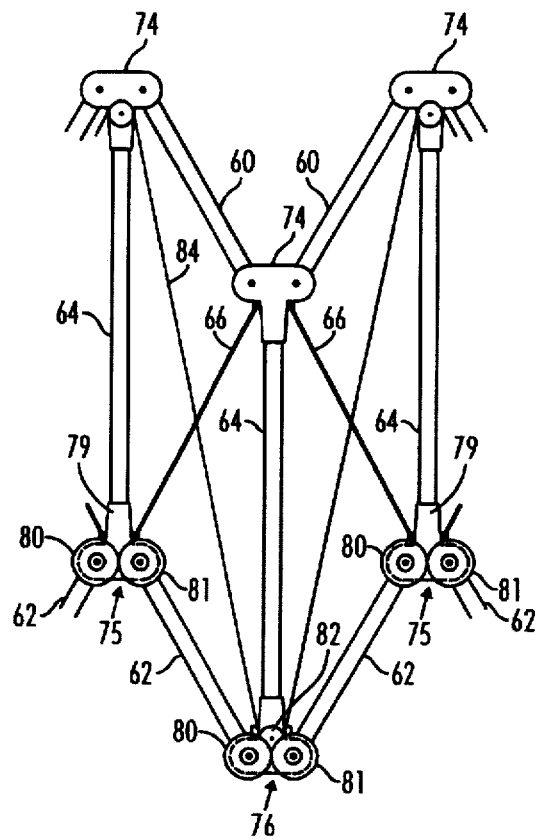
FIG. 22 is a view similar to that of FIG. 21 showing the rim of FIG. 21 between a collapsed state and the fully deployed state.
Figure 23:
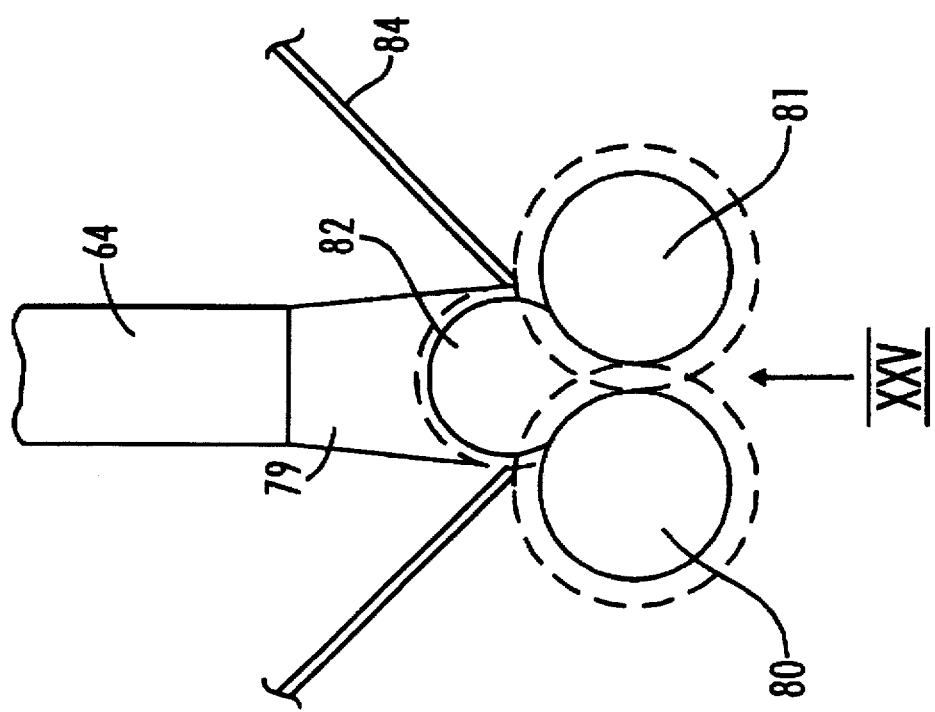
FIG. 23 is a front elevational view of a component of the structure shown in FIGS. 21 and 22.
Figure 24:
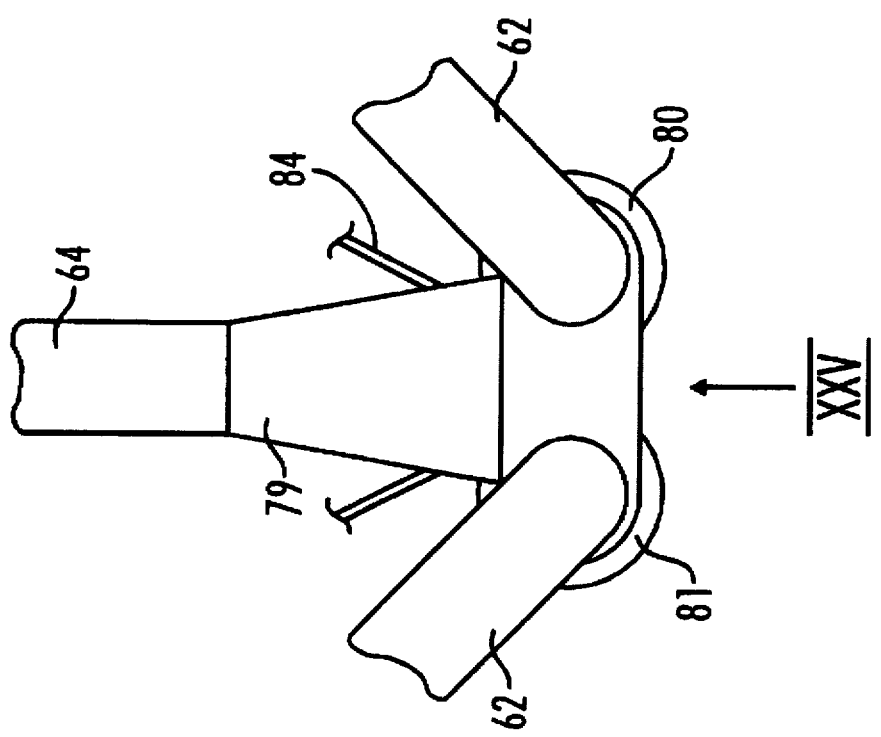
FIG. 24 is a rear elevational view of the component shown in FIG. 23.
Figure 25:
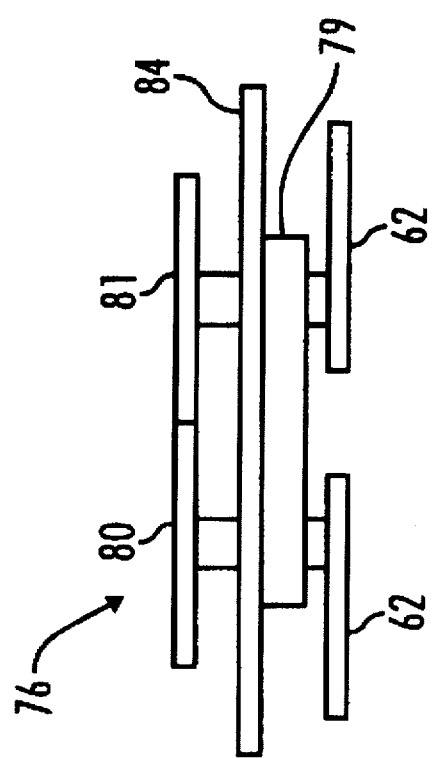
FIG. 25 is a bottom plan view in the direction of arrows XXV of FIGS. 23 and 24.

A portion of a deployable two-longeron rim according to the invention is shown in FIGS. 21 and 22 and a connecting member of this rim is shown in FIGS. 23, 24 and 25.

In FIG. 21 the rim is shown fully deployed and in FIG. 22 the rim is partially collapsed. The complete rim, in its fully deployed state, has the form shown in FIG. 16 and is composed of a series of upper longerons 60 forming an upper ring, a series of lower longerons 62 forming a lower ring, vertical struts 64 extending vertically between the upper and lower rings and diagonal struts 66 extending diagonally between the upper and lower rings.

Two adjacent longerons 60, 62 of each ring are pivotally connected to a respective vertical strut 64 by a connecting member 74, 75, or 76. Longerons 60 are connected to the upper ends of vertical struts 64 by connecting members 74. Each connecting member 74 is fastened to a vertical strut 64 and carries two pivot pins 77 via which two adjacent struts 60 are pivotally connected to connecting member 74. Every other connecting member 74 further carries a freely rotatable pulley wheel 78 along the lower ring, connecting members 75 alternate with connecting members 76. Each of connecting members 75, 76 includes a support piece 79 on which two gear wheels 80 and 81 are rotatably mounted. Each gear wheel 80, 81 is fixed to a respective end of a respective strut 62 so that each strut 62 forms a rigid, unitary structure with one gear wheel 80 and one gear wheel 81. On each connecting member 75, 76, gear wheels 80 and 81 mesh with one another to rotate in unison but in respectively opposite sense.

Each connecting member 76 further includes a pulley 82 which is rotatably mounted on support piece 79.

Each diagonal strut 66 extends between a connecting member 74 which does not carry a pulley wheel 78 and a connecting member 75. Each diagonal strut 66 may be a telescoping member, similar in structure to an automobile antenna except with a latch between segments, constructed to have good tensile strength.

A deployment cable 84 is looped alternatingly around pulley wheels 78 and 82 and thus follows a zig-zag path around the periphery of the rim. One end of cable 84 is secured to the rim at any convenient point and the other end of cable 84 is secured to a mechanism, such as a motor, for producing a deployment force.

FIGS. 23 and 24 are, respectively, front and rear elevational detail views of a connecting member 76. FIG. 25 is a bottom plan view in the direction of arrow XXV of FIG. 24.

When the rim is fully collapsed, struts 64 are directly adjacent one another and struts 60 and 62 extend nearly vertically. To deploy the antenna, tension is applied to the end of cable which is connected to a deployment force mechanism. This causes struts 60 and 62 to pivot about their associated connecting members 74, 75 and 76 through the state shown in FIG. 22 to the fully deployed state shown in FIG. 21. Each set of gears 80, 81 rotate in unison so that all struts 60, 62 pivot in synchronism to effect a smooth deployment of the rim and the frame and support nets.

Figure 26:
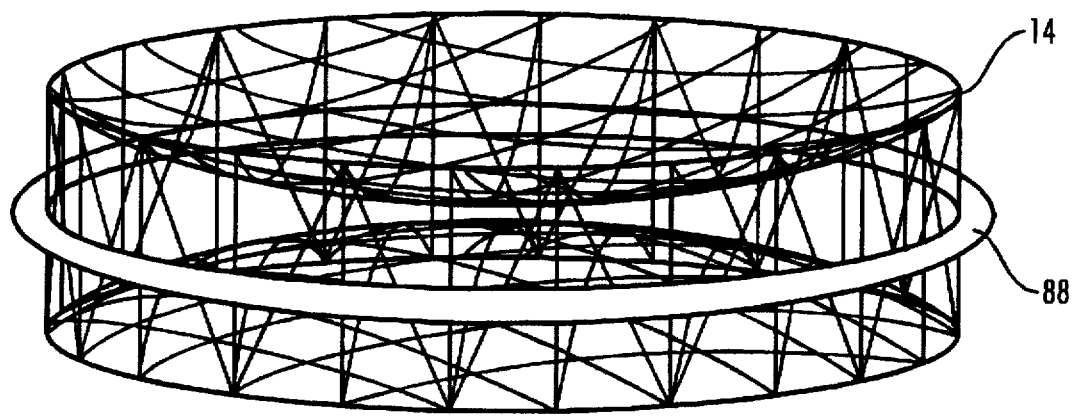
FIGS. 26 and 28 are perspective views of other embodiments of an outer rim structure of the present invention.
Figure 27A:
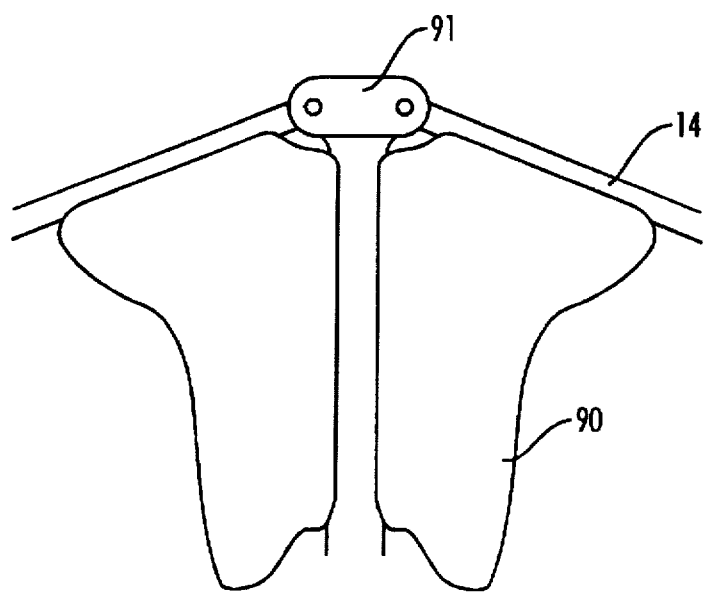
FIGS. 27a and 27b are detail views of a part of a rim showing inflatable air bag deployment sequence of the outer rim structure of an embodiment of the present invention.
Figure 27B:
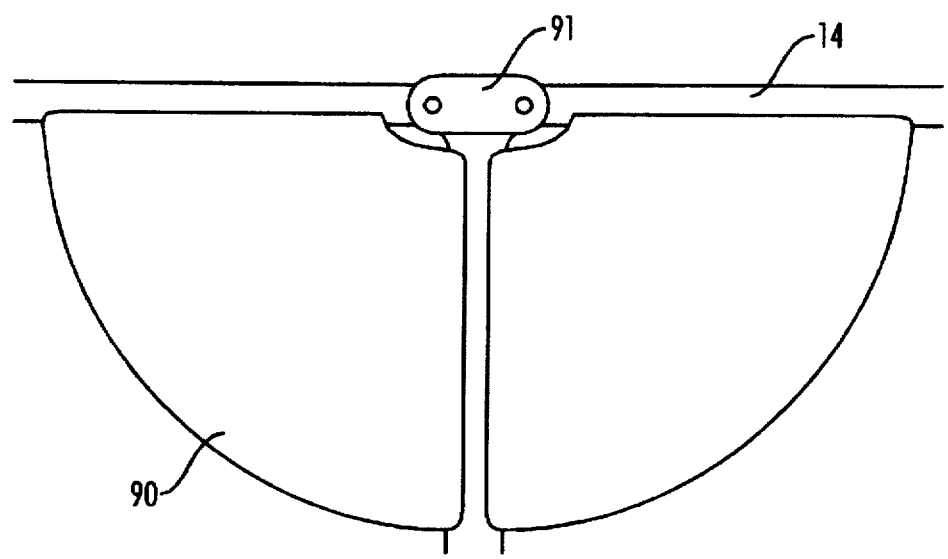

Alternatively, the outer rim may be deployed using a tubular inflatable air bag 88 or balloon coupled to the external perimeter of the rim 14, as shown in FIG. 26. The rim 14 may be deployed uniformly and synchronously upon inflation of the toroidal balloon 88. In another embodiment, a plurality of actuators may be distributed around the outer rim to synchronize the deployment of the rim. Such distributed actuators may comprise electrical drive motors, e.g., stepper motors, or a plurality of air bag devices 90 coupled to articulating joints 91 of the outer rim 14, as shown in FIGS. 27a, b. Upon actuation of the motors or inflation of air bags 90, respectively, the various linkage members of the outer rim 14 may be deployed uniformly and synchronously.

Figure 28:
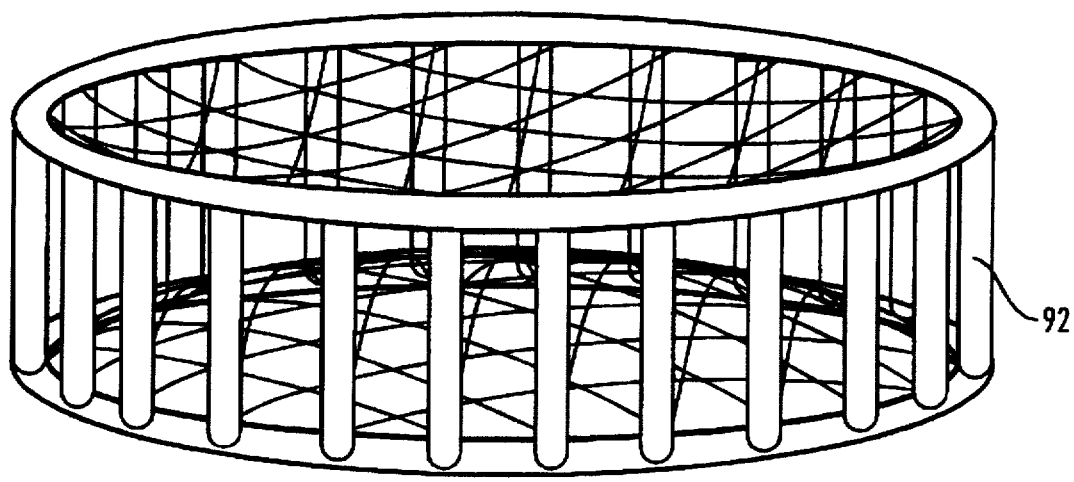

In yet another embodiment, shown in FIG. 28, the entire outer rim may be constructed of inflatable tubing material 92. By simply inflating the initially deflated rim, the rim may be quickly and easily deployed. In addition, preferably, the inflatable tubing is constructed to permanently harden after inflation and deployment in space.

In addition, it will be recognized that the basic reflector antenna structure may be transported and used in a nondeployable arrangement to further minimize the weight of the antenna. For example, depending upon the aperture size of the outer rim, the rim and reflective net surface may be transported and mounted on a spacecraft in its fully deployed state, without any need for folding or further packing. Thus, the outer rim structure for a fixed-shape reflector antenna may be constructed of tubular cylindrical or square members bolted or otherwise welded together. The reflector surface may also be transported in an unfurled state.

Figure 29:
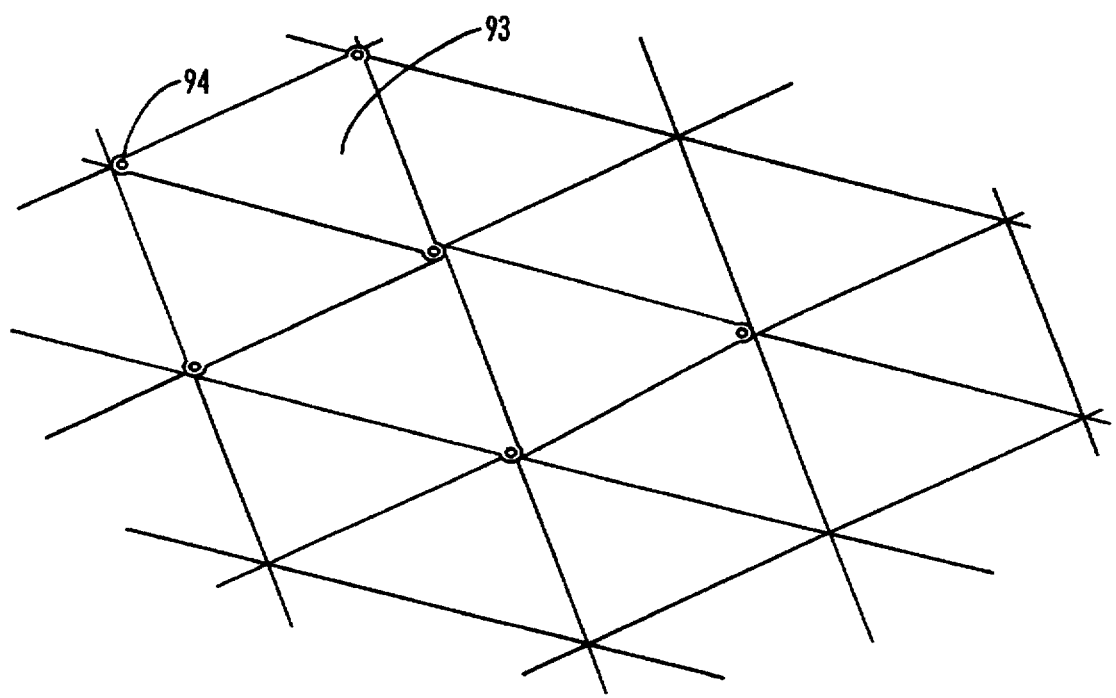
FIG. 29 is a detail plan view of a reflective surface of another embodiment of the present invention.

In a permanently deployed arrangement, the reflector may be constituted by a membrane formed of a plurality of flat reflective polygonal, preferably triangular, facets 93 as shown in FIG. 29. Each facet 93 may be constituted by a sheet of a radar reflecting, electrically conductive metal, such as aluminum. The sheet will be given a thickness sufficient to withstand, without stretching or deformation, the tension forces required to hold the membrane in the desired paraboloidal shape. Such a membrane will perform the functions of both the network of intersecting bands and the reflective mesh of embodiments previously described herein. However, an antenna having a membrane formed of triangular facets will be somewhat heavier than one having a network of bands and a reflective mesh.

In the permanently deployed arrangement described above, the rear unit (8) may be a network of bands and preferably has the same shape as the reflector to help equalize radial loading on the rim structure.

In the embodiment of FIG. 29, each facet 93 is provided, at each corner, with a connecting point 94 where corresponding corners of adjacent facets 93 are connected together. A tension member, as described earlier herein, is connected to each point 94 and may serve to connect adjacent facets 93 together. The surface formed by facets 93 may be provided alone or may be associated with a network of bands, as described above.

The embodiment shown in FIG. 29 may also be employed as a solar radiation concentrator by giving facets 93 a light reflecting finish or coating. Any known techniques for imparting a high level of light reflectivity to facets 93 may be employed.

The embodiment shown in FIG. 29 may also be constructed, like the previously described embodiments, to have a network of intersecting bands which help to maintain the desired reflector surface shape. In this case, each corner of each facet 93 would be secured in any suitable manner to a node of the intersecting bands and/or to a respective tension member.

The presently disclosed embodiments are to be considered in all respects as illustrative and not restrictive. The scope of the invention being indicated by the appended claims, rather than the foregoing description, and all changes which come within the meaning and range of equivalency are, therefore, intended to be embraced therein.

What is claimed:

1. A reflector assembly having a deployed state and comprising, when in the deployed state;
    a support rim defining a peripheral edge around a longitudinal axis;
    at least one substantially inextensible support stratum defining a curved, generally dish-shaped contour within said peripheral edge, said substantially inextensible stratum comprising a first network of flexible, elongated members composed of substantially inextensible material and coupled to the peripheral edge of said support rim;
    a flexible, generally extensible reflector defining an electromagnetically reflective surface and an opposite surface, wherein one of said reflective surface and opposite surface is arranged to stretch over and conform to the shape of the curved, generally dish-shaped contour of said support stratum such that the reflective surface forms a curved, generally dish shape;
    at least one tensioner coupled to said support stratum to maintain the curved, generally dish-shaped contour of said support stratum.

2. A reflector assembly as recited in claim 1, wherein said first network of flexible, elongated members comprises a first set of generally parallel flexible members, a second set of generally parallel flexible members arranged to traverse said first set of flexible members, and a third set generally parallel flexible members arranged to traverse said first and second sets of flexible members, wherein the first, second and third sets of flexible members define a plurality of generally polygonal interstices therebetween.

3. A reflector assembly as recited in claim 2, wherein said first, second and third sets of flexible elongated members extend in a mutually intersecting arrangement, such that a plurality of intersection points are defined by the intersection of an elongated member of each of said first, second and third sets.

4. A reflector assembly as recited in claim 2, wherein each flexible elongated member comprises a band having a width, and a thickness, the width being substantially greater than the thickness and wherein each band has two opposed ends which are secured to the peripheral edge of said rim.

5. A reflector assembly as recited in claim 1, wherein in the deployed state, said support rim comprises a plurality of first elongated and generally rigid members, a plurality of second elongated and generally rigid members and a plurality of third elongated and generally rigid members, wherein, said first generally rigid members are coupled to form a first peripheral edge extending around said longitudinal axis, said second generally rigid members are coupled to form a second peripheral edge extending around said longitudinal axis, and said third generally rigid members are coupled between said first and second peripheral edges to maintain said first and second peripheral edges spaced apart in the direction of said longitudinal axis.

6. A reflector assembly as recited in claim 5, wherein said support rim comprises a collapsible structure that is collapsible into a retracted state, in which the reflector assembly occupies a smaller volume than when in the deployed state.

7. A reflector assembly as recited in claim 6, wherein said support rim further comprises a plurality of coupling members, each coupling member coupling together two of said first generally rigid members and one of said third generally rigid members.

8. A reflector assembly as recited in claim 7, wherein each of said coupling members comprises pivot means forming pivotal connections between the first generally rigid members and the third generally rigid member which are coupled by said coupling member.

9. A reflector assembly as recited in claim 8, wherein said pivot means of each of said coupling members comprises a gear mechanism.

10. A reflector assembly as recited in claim 8, wherein said first and third generally rigid members which are coupled together by each said coupling member are pivotal relative to one another between a first relative position when said reflector assembly is in the retracted state and a second relative position when said reflector is in the deployed state.

11. A reflector assembly as recited in claim 10, further comprising deployment means coupled to said support rim for moving said first and third generally rigid members between said first and second relative positions.

12. A reflector assembly as recited in claim 11, wherein said deployment means comprises a cable extending between, and operatively coupled to said coupling members.

13. A reflector assembly as recited in claim 11, wherein said deployment means comprises an inflatable ring connected to said third generally rigid members.

14. A reflector assembly as recited in claim 5, wherein said first, second and third generally rigid members are inflatable components.

15. A reflector assembly as recited in claim 1, wherein the flexible reflector comprises a conductive mesh.

16. A reflector assembly as recited in claim 15, wherein said at least one support stratum comprises first and second support strata, each support stratum defining a concave contour and an opposite facing convex contour, wherein the support strata are arranged with the convex contour of the first support stratum facing the convex contour of the second support stratum.

17. A reflector assembly as recited in claim 16, wherein said flexible reflector is disposed between the first and second support strata.

18. A reflector assembly as recited in claim 16, wherein said flexible reflector comprises a sheet defining a reflective sheet surface, wherein said sheet is disposed between the first and second support strata, with the reflective surface of the sheet disposed against the convex contour of the first support stratum.

19. A reflector assembly as recited in claim 1, wherein said at least one support stratum is coupled to the peripheral edge of said support rim to provide radial rigidity to said support rim.

20. A reflector assembly as defined in claim 4 wherein said tensioner comprise; a second flexible stratum of substantially inextensible material; and a plurality of tension applying members connected to both strata for applying tensioning forces which cause the second stratum to form a substantially paraboloidal shape substantially identical to that of said curved surface.

21. A reflector assembly as defined in claim 4 wherein said tensioner comprises; a second network of bands of flexible, substantially inextensible material, said bands of said second network being arranged in a plurality of sets of bands, with the bands of each set intersecting the bands of each other set at a plurality of points of intersection, each band having two opposed ends which are secured to a second peripheral edge of said rim, and a plurality of tension applying members each connected between a respective point of intersection of said bands of said first network and a respective point of intersection of said bands of said second network.

22. A reflector assembly as defined in claim 21 wherein each point of intersection of said bands of said second network is aligned with a respective point of intersection of said bands of said first network parallel to said longitudinal axis and each said tension applying member is connected between mutually aligned points of intersection of said bands of said first and second network.

23. A reflector assembly as defined in claim 22 wherein said tensioner further comprises a plurality of positioning plates each supporting a plurality of bands at a respective point of intersection of said bands of said first network and connected to a respective tension applying member.

24. A reflector assembly as defined in claim 23 wherein each said positioning plate is provided with a plurality of grooves for receiving said plurality of bands which are supported by said positioning plate.

25. A reflector assembly as defined in claim 21 wherein each said tension applying member comprises a tension spring.

26. A reflector assembly as defined in claim 21 wherein said first and second networks of bands have substantially identical curved shapes.

27. A reflector assembly as defined in claim 21 wherein said tensioner further comprises a plurality of positioning plates each supporting a plurality of bands at a respective point of intersection of said bands of said first network and connected to a respective tension applying member.

28. A reflector assembly as defined in claim 4 wherein each said band is composed of a plurality of individual band portions each extending between two adjacent points of intersection, and said tensioner comprises a plurality of positioning plates each holding a plurality of said band portions at a respective point of intersection.

29. A reflector assembly as defined in claim 1 wherein said support rim has a triangular cross section.

30. A reflector assembly as defined in claim 1 wherein said support rim has a rectangular cross section.

31. A reflector assembly as defined in claim 4 wherein said bands of said first network are made of a composite material.

32. A reflector assembly as defined in claim 1 wherein said support rim is made of a composite material.

33. A reflector assembly as defined in claim 1 wherein said curved surface has a substantially paraboloidal shape.

34. A reflector assembly having a deployed state and comprising, when in the deployed state;

a rim structure having a longitudinal axis and a closed periphery centered on said longitudinal axis, said rim structure having first members which form first and second peripheral edges and a plurality of second members which extend between said peripheral edges to cause said peripheral edge to be spaced apart in the direction of said longitudinal axis while opposing forces tending to move said peripheral edges toward one another;

a reflector structure supported by the rim structure forming a curved surface and comprising a flexible stratum of substantially inextensible material, wherein said stratum of said reflector structure is constituted by a plurality of polygonal pieces of substantially inextensible material;

an electromagnetic reflector having a first and a second side, the electromagnetic reflector being supported by having its first side abut the curved surface of the reflector structure; and tensioning means connected to said stratum for applying tensioning forces which cause said stratum to form said curved surface.

35. A reflector assembly as defined in claim 34 wherein said tensioning means comprise a second flexible stratum of substantially inextensible material, and both of said flexible strata have substantially identical curved shapes.

36. A reflector assembly having a deployed state and comprising, when in the deployed state;

a rim structure having a longitudinal axis and a closed periphery centered on said longitudinal axis, said rim structure having first members which form first and second peripheral edges and a plurality of second members which extend between said peripheral edges to cause said peripheral edges to be spaced apart in the direction of said longitudinal axis while opposing forces tending to move said peripheral edges toward one another;

a reflector structure having a curved surface and comprising a flexible stratum of substantially inextensible material wherein said stratum comprises a plurality of polygonal pieces which are constituted by triangular metal sheets; and tensioning means connected to said stratum for applying tensioning forces which cause said stratum to form said curved surface.

37. A reflector assembly having a deployed state and comprising, when in the deployed state;

a rim structure having a longitudinal axis and a closed periphery centered on said longitudinal axis, said rim structure having first members which form three peripheral edges of substantially annular shape, the first peripheral edge having a first diameter, the second peripheral edge having a second diameter, and the third peripheral edge having a third diameter, the third diameter being smaller than the first and the second diameters, a plurality of second members which extend between said first and second peripheral edges to cause said first and second peripheral edges to be spaced apart in the direction of said longitudinal axis, and between said third peripheral edge and said first and second peripheral edges to cause said third peripheral edge to be spaced apart from said first and second peripheral edges, while opposing forces tend to move said peripheral edges toward one another, and to cause the rim structure to have a triangular cross section;

a reflector structure forming a curved surface and comprising a flexible stratum of substantially inextensible material;

an electromagnetic reflector supported by the reflector structure; and tensioning means connected to said stratum for applying tensioning forces which cause said stratum to form said curved surface.

38. A light weight reflector assembly having a deployed state and comprising, when in the deployed state;

a rim structure having a longitudinal axis and a closed periphery centered on said longitudinal axis, said rim structure having first members which form first and second radially rigid peripheral edges and a plurality of second members which extend between said peripheral edges to cause said peripheral edges to be spaced apart in the direction of said longitudinal axis while opposing forces tending to move said peripheral edges toward one another, each of said first members comprises a plurality of individual structural parts, and said rim structure further comprises a plurality of connection members each connecting together two of said individual structural parts of one of said peripheral edges and one of said second members, wherein each said connecting member comprises pivot means forming pivotal connections between said structural parts and said second member which are connected together by said connecting member, wherein said pivot means of each said connecting member is operative for causing said structural parts which are connected by said connecting member to pivot in synchronism with one another relative to said second member which is connected by said connecting member, wherein said structural parts which are connected together by each said connecting member are pivotal relative to one another between a first relative position when said reflector assembly is in the retracted state and a second relative position when said reflector assembly is in the deployed state;

deployment means coupled to said rim structure for moving said structural parts between the first relative position and the second relative position, wherein said deployment means comprise inflatable elements extending between said second member and said two individual structural parts connected together by each said connecting member;

a reflector structure supported by the rim structure forming a curved surface and comprising a flexible stratum of substantially inextensible material; and tensioning means connected to said stratum for applying tensioning forces which cause said stratum to form said curved surface.

39. A method of making a reflector assembly having a deployed state, the method comprising the steps of;

forming with first members first and second radially rigid peripheral edges;

extending a plurality of second members between said peripheral edges to cause said peripheral edges to be spaced apart substantially parallel to each other in the direction perpendicular to the planes of said peripheral edges to form a rim structure;

arraying elongated members of flexible, substantially inextensible material in a plurality of sets to form a first network of a reflector structure;

supporting the reflector structure with the rim structure whereby the first network is secured to the first peripheral edge;

applying tensioning forces to the first network which cause the first network to form a curved surface;

abutting an electromagnetic reflector onto the curved surface of the first network of the reflector structure.

40. A method as recited in claim 39, further comprising the steps of;

intersecting the elongated members of each other set at a plurality of points of intersection to form a substantially geodesic structure;

selecting a length for each elongated member to enable the elongated member to form said curved surface.

41. A method as recited in claim 40, wherein the step of applying tensioning forces comprises the steps of;

arranging elongated members of flexible, substantially inextensible material in a plurality of sets, with the elongated members of each set intersecting the elongated members of each other set at a plurality of points of intersection, to form a second network of the reflector structure;

securing said second network to said second peripheral edge of said rim structure;

connecting each of a plurality of tension applying members between a respective point of intersection of said elongated members of said first network and a respective point of intersection of said elongated members of said second network.

42. A method as recited in claim 41, wherein the step of connecting tension applying members comprises the step of connecting tension springs.

43. A reflector assembly having a deployed state and comprising, when in the deployed state;

a support rim defining a peripheral edge around a longitudinal axis;

at least one substantially inextensible support stratum defining a curved, generally dish-shaped contour within said peripheral edge, said substantially inextensible stratum comprising a first network of flexible, elongated members composed of substantially inextensible material and coupled to the peripheral edge of said support rim;

a flexible, generally extensible reflector defining an electromagnetically reflective surface and an opposite surface, wherein one of said reflective surface and opposite surface is arranged to stretch over and conform to the shape of the curved, generally dish-shaped contour of said support stratum such that the reflective surface forms a curved, generally dish shape;

at least one tensioner coupled to said support stratum to maintain the curved, generally dish-shaped contour of said support stratum;

wherein in the deployed state, said support rim comprises a plurality of first elongated and generally rigid members, a plurality of second elongated and generally rigid members and a plurality of third elongated and generally rigid members, wherein, said first generally rigid members are coupled to form a first peripheral edge extending around said longitudinal axis, said second generally rigid members are coupled to form a second peripheral edge extending around said longitudinal axis, and said third generally rigid members are coupled between said first and second peripheral edges to maintain said first and second peripheral edges spaced apart in the direction of said longitudinal axis;

wherein said support rim comprises a collapsible structure that is collapsible into a retracted state, in which the reflector assembly occupies a smaller volume than when in the deployed state, wherein said support rim further comprises a plurality of coupling members, each coupling member coupling together two of said first generally rigid members and one of said third generally rigid members, and wherein each of said coupling members comprises pivot means forming pivotal connections between the first generally rigid members and the third generally rigid member which are coupled by said coupling member;

wherein said first and third generally rigid members which are coupled together by each said coupling member are pivotal relative to one another between a first relative position when said reflector assembly is in the retracted state and a second relative position when said reflector assembly is in the deployed state;

wherein said reflector assembly further comprising deployment means coupled to said support rim for moving said first and third generally rigid members between said first and second relative positions; and wherein said deployment means comprise inflatable elements extending between the third generally rigid member and the two first generally rigid members coupled together by each said coupling member.

* * * * *